UNITED STATES PATENT OFFICE.

DAVID H. BUDLONG, OF ST. LOUIS, MISSOURI.

MANUFACTURE OF ARTIFICIAL STONE AND MARBLE.

SPECIFICATION forming part of Letters Patent No. 254,530, dated March 7, 1882.

Application filed January 11, 1882. (No specimens.)

*To all whom it may concern:*

Be it known that I, DAVID HUESTIS BUDLONG, of St. Louis, in the county of St. Louis, and in the State of Missouri, have invented certain new and useful Improvements in the Manufacture of Artificial Stone and Marble; and I do hereby declare that the following is a full, clear, and exact description thereof.

This invention relates to certain improvements in the manufacture of artificial stone, such as marble, conglomerate, and the like; and it has for its objects to provide a compound that will readily set and harden when properly laid or applied to a suitable surface, and which may be put into any shapes or designs, as more fully hereinafter set forth.

In carrying out my invention I first make a solution of the following ingredients in about the following proportions, to wit: tartaric acid, twenty ounces, more or less; sodæ arsenias, five pounds, more or less; sodæ caustica, four pounds, more or less; carburet of iron, one gallon, more or less; sodæ citro tartras, four pounds, more or less; oxide of lead, seven pounds, more or less. I dissolve the above ingredients in ether, naphtha, alcohol, or any other liquid that will cut the same, and to each two quarts of the solution add two hundred gallons of water, more or less, which forms a solution for general purposes. For heavy work the proportions of the ingredients may be doubled, or even trebled, to produce a rapid crystallization, and form a compact insoluble compound when mixed with the other ingredients.

In the manufacture of artificial stone generally I take, say, about twenty-five parts (more or less) of sharp silicious sand or gravel, or about the same amount of tailings of quartz, the latter being a waste product which accumulates in mining regions, and which has hitherto been considered worthless. This I mix with the above-mentioned solution, adding Keen's or other hydraulic cement in such proportions as to make a plastic or semi-plastic mass, and mold the same into blocks suitable for paving or architectural purposes, or apply it directly to the surface of the ground or to the structures for which it is intended, care being taken to thoroughly mix the ingredients, so as to form a homogeneous mass.

Instead of the quartz-tailings mentioned, coal-dust or coal-screenings—a material accumulating in large quantities at the coal-mines throughout the world, and which has heretofore been considered worthless—may be used, forming an artificial product possessing all the characteristics of the natural mineral.

In the manufacture of artificial marble I take the above-mentioned compound and mix with it Keen's or other white cement, making a mixture of about the consistency of cream or paste. The mixture I then pour into a suitable mold or form, to form a block of any suitable shape. In order to form the veins or variegations, in imitation of the natural marble, I take the white compound as thus prepared, in several lots, according to the colors to be produced upon the surface of the finished stone, and mix with such, in separate vessels, mineral or other colors of suitable nature. I then take such colored varieties of the compound and place suitable quantities of the same upon the surface of the mass in the mold or form, and with the fingers or by means of a suitable instrument mix the surface so as to blend the colors, so as to closely imitate the veins of the natural stone. In order to more closely imitate natural stones, after the block has had its surface thus prepared I turn it out, before drying, upon a smooth surface, face downward, which causes the colors to run and further blend together, forming a variegated surface, which may be made to resemble any variety of marble.

My improved compound may be applied to the construction of hollow walls, monuments, cemetery-work, architectural work, hollow sea-walls, caissons, abutments, piers, and all other purposes where walls of great strength are required.

Having thus described my invention, what I claim, and desire to secure by Letters Patent, is—

1. The compound herein described for the manufacture of artificial stone or marble, in connection with sharp silicious sand or gravel, quartz-tailings, coal-screenings, and cement or other similar material, substantially as specified.

2. The process herein described of producing a variegated surface upon the blocks of artificial stone or marble, the same consisting in first pouring the composition of proper consistency into a mold or form, then placing upon the same the compound in different colors, then blending the same by stirring, and finally forming the surface by turning the partially-hardened block out upon a suitable surface, substantially as specified.

In testimony whereof I affix my signature, in presence of two witnesses, this 11th day of January, 1882.

D. H. BUDLONG.

Witnesses:
J. J. McCARTHY,
CHAS. D. DAVIS.